United States Patent
Atwater et al.

(10) Patent No.: US 6,804,062 B2
(45) Date of Patent: Oct. 12, 2004

(54) NONIMAGING CONCENTRATOR LENS ARRAYS AND MICROFABRICATION OF THE SAME

(75) Inventors: Harry A. Atwater, So. Pasadena, CA (US); Janet Qi Zhou, Northridge, CA (US); Yann Gambin, Paris (FR); Stephen R. Quake, San Marino, CA (US)

(73) Assignee: California Institute of Technology, Pasadena, CA (US)

( * ) Notice: Subject to any disclaimer, the term of this patent is extended or adjusted under 35 U.S.C. 154(b) by 97 days.

(21) Appl. No.: 10/266,806

(22) Filed: Oct. 8, 2002

(65) Prior Publication Data

US 2003/0095340 A1 May 22, 2003

Related U.S. Application Data

(60) Provisional application No. 60/328,314, filed on Oct. 9, 2001.

(51) Int. Cl.$^7$ .................. G02B 27/10; G02B 27/30; G02B 13/18; G02B 3/08; B32B 3/10
(52) U.S. Cl. .............. 359/626; 621/622; 621/641; 621/642; 621/717; 621/719; 621/742; 428/138; 369/13.33; 369/44.14; 385/129
(58) Field of Search .................. 359/621, 622, 359/626, 619, 641, 642, 664, 368, 717, 719, 742, 796, 13.33, 44.14, 112.24, 112.28; 385/129; 428/131, 138

(56) References Cited

U.S. PATENT DOCUMENTS

| | | | | |
|---|---|---|---|---|
| 5,859,814 A | * | 1/1999 | Kino et al. | 369/13.33 |
| 6,452,726 B1 | * | 9/2002 | Mandella | 359/641 |
| 6,548,144 B1 | * | 4/2003 | Teshima et al. | 428/138 |
| 6,560,030 B2 | * | 5/2003 | Legrand et al. | 359/642 |
| 6,594,430 B1 | * | 7/2003 | Rausch et al. | 385/129 |
| 6,608,726 B2 | * | 8/2003 | Legrand et al. | 359/392 |
| 6,625,864 B2 | * | 9/2003 | Nemoto et al. | 29/527.2 |
| 6,633,439 B1 | * | 10/2003 | Xu et al. | 359/719 |

* cited by examiner

Primary Examiner—Loha Ben
(74) Attorney, Agent, or Firm—Daniel L. Dawes; Myers Dawes Andras & Sherman LLP

(57) ABSTRACT

This project encompassed design and fabrication of a single pixel for a solar concentrator photovoltaic monolithic microarray. Photovoltaic concentrators offer a competitive electricity cost. Such concentrating microarrays may enable photovoltaic cells with 40–50% efficiency using III–V compound heterostructures. The main components of the design include a thin film solar cell, an array of soft polymer microlenses to optimally concentrate solar radiation, and a heat sink to manage the heat dissipated. Microlens arrays were fabricated in polydimethylsiloxane (PDMS) using soft lithography techniques and the optical properties (absorbance, lens magnification, aberrations, etc) were characterized. The results indicate that such microarrays can be used for a monolithic concentrating photovoltaic array.

20 Claims, 13 Drawing Sheets

NONIMAGING CONCENTRATOR LENS ARRAYS AND MICROFABRICATION OF THE SAME

RELATED APPLICATIONS

The present application is related to and claims priority pursuant to 35 USC 119 to U.S. Provisional Patent Application Ser. No. 60/328,314, filed Oct. 9, 2001, which is incorporated herein by reference.

BACKGROUND OF THE INVENTION

1. Field of the Invention

The invention relates to the field of solar concentrator photovoltaic monolithic microarrays, and more particularly to the lens used in such arrays.

2. Description of the Prior Art

Commercially available solar cells have efficiencies ranging from 8% to 15%. The current world record is 29% efficiency in normal operating conditions and 32.6% efficiency under concentration. It is well known that concentrating solar energy onto the photovoltaic cell increases the cell's efficiency. However, such lenses when made of glass and the arrays made from them are costly in large arrays.

The fabrication of solid immersion lenses from polydimethylsiloxanes (General Electric RTV615) is well known and shown by U.S. Pat. No. 6,301,055 (2001) for use in imaging systems, and the combination of a focusing lens with a glass solid immersion lens for use in a recording apparatus, typically compact disc players or writers is described for example in U.S. Pat. No. 6,369,957 (2002).

What is needed is some kind of a method for producing more efficient solar cells at lower cost per watt of solar energy.

BRIEF SUMMARY OF THE INVENTION

The invention is directed to a non-imaging mirrorless optical lens system that serves as concentrator lenses for concentrated-sunlight photovoltaics applications using polydimethylsiloxanes (PMDS or GB Silicones RTV615A and B) using soft lithography techniques. The microconcentrator lens arrays provide the performance advantages of concentrator photovoltaics, e.g. higher cell efficiency, smaller cell absorber area, which are realized while preserving the overall sheet-like solar module geometry that is typically employed in nonconcentrator photovoltaic systems. Notably, the reduction in total cell absorber area enables economically competitive terrestrial photovoltaic module designs that utilize cell components with relatively high cost/area, such as compound semiconductor tandem multifunction solar cells and high efficiency silicon solar cells.

The fabrication of microconcentrator lenses according to the invention first requires the preparation of molds and subsequently solid immersion lenses and Fresnel lenses. The molds for these lenses are composed of PMDS A and B components in a ratio varying between 8:1 to 11: by weight. Ruby ball bearings can be employed as forms to make the molds for the solid immersion lenses. The fabricated molds are subsequently degassed and cured prior to use. Lens arrays as also fabricated using PMDS A and B components in a ratio varying between 8:1 and 11:1. The molded lenses are peeled from the RTV molds following a second degas and cure step.

The composite lens array is comprised of a Fresnel lens and two solid immersion lenses combined to make a double solid immersion lens with typical total magnification in the range of 10 to 100 times. It is possible using the methodology of the invention to fabricate lenses of ~1 cm$^2$ area free of bubbles, macroscopic contaminants and other defects. Visible Spectroscopy absorption measurements on the composite lens indicate an extinction loss (absorption+ scattering) of <5% for photon energies between 1.3 and 3.3 eV, and infrared spectroscopy indicates relatively strong toluene-related absorption for photon energies less than 0.5 eV. These results clearly indicate suitability of PDMS lenses as optical elements of nonimaging microconcentrator lens arrays to enable flat plate microconcentrator photovoltaics.

In particular the invention is a method of fabricating a lens array for inclusion in a concentrator photovoltaic array comprising the steps of forming a plurality of Fresnel lenses and solid immersion lenses from optical grade silicone rubber. The plurality of Fresnel lenses and solid immersion lens are combined to form a compound optical system for focusing light at a corresponding plurality of locations. The compound optical system is disposed onto an array of photovoltaic cells such that light incident on the compound optical system is concentrated into each of the photovoltaic cells of the array.

The method of forming the plurality of solid immersion lenses comprises in turn for each solid immersion lens the steps of forming a cured bottom layer in a mold container, disposing a predetermined amount of molding material to form a second uncured layer on the bottom layer according to the desired height, h, of the solid immersion lens to be formed, embedding a spherical form into the second layer so that the spherical form rests on the bottom layer, curing the second layer with the spherical form in place, removing the spherical form from the cured second layer, disposing a predetermined amount of optical grade silicone rubber into the cured second layer according to the desired height of the solid immersion lens to be formed and according to the thickness of a base layer to be associated with the solid immersion lens, curing the optical grade silicone rubber in the second layer to form a cured solid immersion lens and base layer, and removing the cured solid immersion lens and base layer from the second layer.

The method of forming the plurality of Fresnel lenses comprises for each Fresnel lens the steps of forming a cured bottom layer in a mold container, pressing a Fresnel lens form into the bottom layer so that the lower surface of the Fresnel lens form is completely embedded into the bottom layer, completely covering the upper surface of the Fresnel lens form with molding material to form a second layer in which the Fresnel lens form is embedded, curing the second layer with the Fresnel lens form in place, removing the cured second layer, removing the Fresnel lens form from the bottom layer, disposing optical grade silicone rubber into a mold formed by the cured second layer and bottom layer, curing the optical grade silicone rubber in the mold to form a Fresnel lens, and removing the cured Fresnel lens from the mold. In the illustrated embodiment the plurality of Fresnel and solid immersion lenses are composed of GE Silicones RTV615 as the optical grade silicone rubber.

The method further comprises the step of cleaning the plurality of solid immersion and Fresnel lenses.

The predetermined amount of molding material to form the second uncured layer comprises disposing sufficient molding material in the mold container to form the second uncured layer with a depth substantially equal to the desired height, h, of the solid immersion lens, where h=R+R/n−a, where "R" is the radius of the spherical lens, "n" is the index of refraction of the cured optical grade silicone rubber, and "a" is the thickness of the base layer associated with the solid immersion lens.

More specifically the step of forming the plurality of Fresnel and solid immersion lenses comprises mixing a silicone rubber compound and a silicone curing agent, and then defoaming the mixed silicone rubber compound and a silicone curing agent, namely mixing not more than 9 parts silicone rubber compound by weight to 1 part silicone curing agent by weight.

The step of forming the cured bottom layer in a mold container, and curing the second layer with the spherical form in place comprises degassing the bottom layer and then heating the degassed bottom layer, preferably for at least one hour in each case.

The method further comprises the step of forming a mold release layer on the cured second layer prior to disposing the predetermined amount of optical grade silicone rubber therein by plasma deposition.

Similarly, the steps of forming a cured bottom layer in a mold container, curing the second layer with the Fresnel lens form in place, and curing the optical grade silicone rubber in the mold to form a Fresnel lens comprise the steps of degassing and heating the bottom layer, second layer and optical grade silicone rubber in the mold respectively, preferably for at least one hour.

It must be understood also that the invention is a photovoltaic array comprising a plurality of Fresnel lenses and solid immersion lenses composed of molded optical grade silicone rubber forming a compound optical system for focusing light at a corresponding plurality of locations. The compound optical system is combined with an array of photovoltaic cells such that light incident on the compound optical system is concentrated into each of the photovoltaic cells of the array.

In one embodiment the Fresnel lens is combined with a single solid immersion lens to focus light for photovoltaic cell of the photovoltaic array. In another embodiment the Fresnel lens is combined with a double solid immersion lens to focus light for photovoltaic cell of the photovoltaic array. Again in the illustrated embodiment the plurality of Fresnel lenses and the plurality of solid immersion lenses are molded in an array from GE Silicones RTV615, or more generally the optical grade silicone rubber is comprised of a silicone rubber compound and a silicone curing agent, which are preferably mixed together in a ratio of not more than 9 parts silicone rubber compound by weight to 1 part silicone curing agent by weight.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Using the invention it is possible to develop a terrestrial photovoltaic cell with 40–50% efficiency using a conventional wafer bonding technique as described in Zahler et.al. "Ge Layer Transfer To Si For Photovoltaic Applications" Thin Solid Films 403: 558–562 (2002). The process allows the fabrication of group III-V compound semiconductors. It has been preliminarily shown that photovoltaic concentrators, compared to standard thin film and silicon flat-plate systems, offer a competitive electricity cost of 6–8 cents/kWh, with the lower number corresponding to a higher efficiency cell. Concentrators based on heterostructure compounds of III-V elements will cost less than this, offering a promising future.

At the moment, materials that can be grown on top of each other by epitaxy are severely limited by the requirement of the same crystal structure and orientation. However, wafer bonding allows us to chemically bond together layers of materials that are not lattice matched and that have band gaps that each absorb a different range of the sun's energy, resulting in greater absorption of sunlight together than each layer could have absorbed individually. This improvement in wafer technology allows greater freedom in deciding which compounds and substrates to incorporate into the cell.

Figure 1:
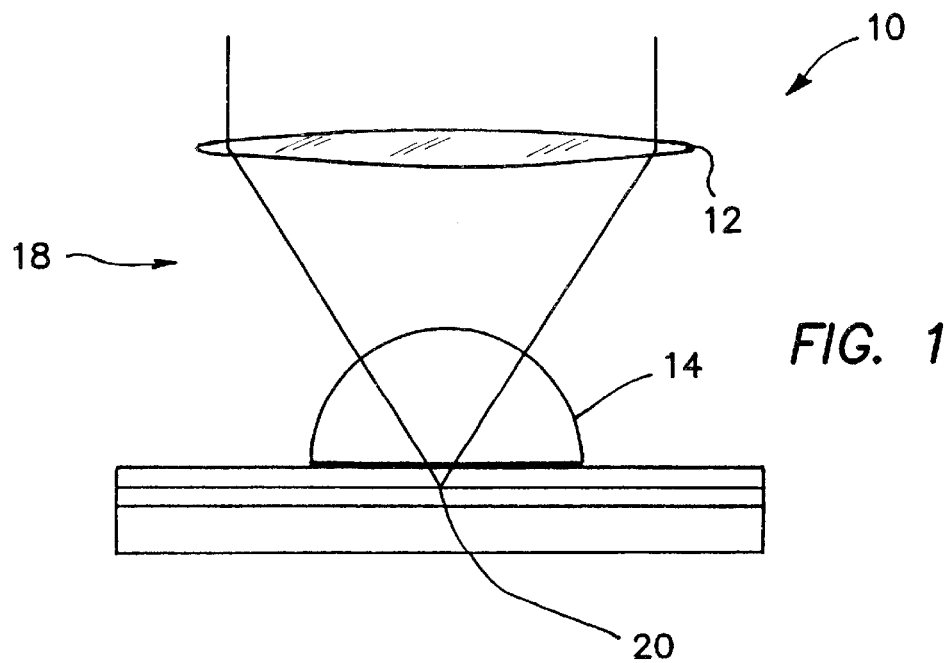
FIG. 1 is a diagrammatic cross-sectional view of one cell of the photovoltaic array devised according to the invention.
Figure 17:
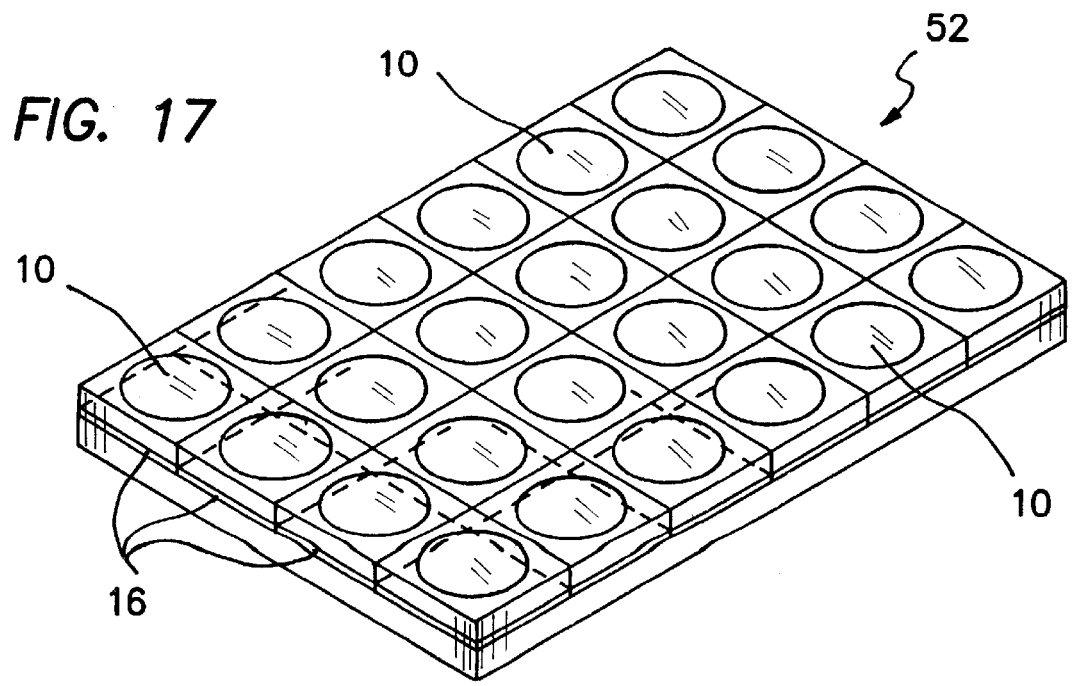
FIG. 17 is a diagrammatic perspective view of a photovoltaic array provided with lenses fabricated according to the invention.
Figure 18:
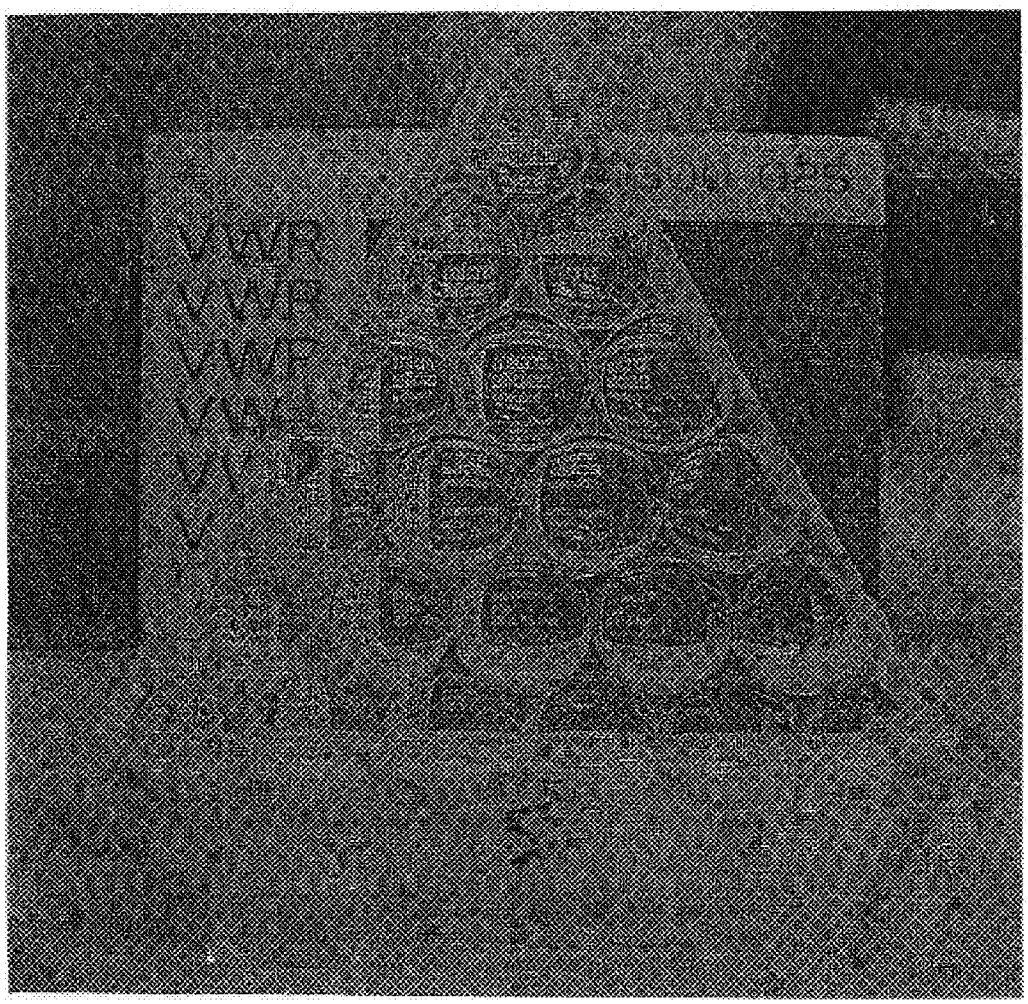
FIG. 18 is a photograph of an array of lenses as used in the photovoltaic array of FIG. 17.

The illustrated embodiment relates to the design and fabrication of a single pixel or cell 18 for an optimally designed monolithic array. The optical design involves using microlens concentrators 10 to focus solar radiation and trap more light in the cell. Under such concentration, the efficiency of the cell increases. The design of the illustrated embodiment as shown in FIG. 1 includes a Fresnel lens 12 atop a solid immersion lens 14 to focus the incoming light to 40–100 times the sun's average energy of about 100 mW/cm$^2$. This arrangement is replicated in an array as diagrammatically shown in FIG. 17. FIG. 17 shows an array 52 comprised of a plurality of concentrator lenses 10, which are each to be understood as symbolically including Fresnel lens 12 atop a solid immersion lens 14 positioned above photovoltaic cells 16. The details of the array and its structure are conventional and are not material in any case to the present invention so that it will not be further described. FIG. 18 is a photograph of an actually manufactured array of solid immersion lenses 14.

The lenses 12, 14 were molded out of polydimethylsiloxane (PDMS), a room temperature vulcanized rubber compound that is cheap and easy to mold. Since polydimethylsiloxane is soft, interesting shapes can be molded that would otherwise not be possible with glass. Upon fabrication of the lenses 12, 14 in the design, their magnification was tested, and found to be in the optimal range, namely 5 to 100. Their internal and external aberrations were also characterized to determine the level of acceptable aberrations. Several block samples of PDMS in varying ratios of the two components and in varying widths were fabricated. These samples were used to determine the transmittance and absorbance in the infrared and visual light spectrums of PDMS. Results show that the microlens system will efficiently and affordably transmit and focus incoming light and can effectively duplicate if not expand the functions of glass lenses.

The next step involves the flow of heat so that the lenses 12, 14 and heterostructure photovoltaic cell 16 beneath the lenses do not overheat. Assuming a magnification of 100 times the sun's average heat of 100 mW/cm$^2$, the average heat on the cell 16 will be 10 W/cm$^2$. At 30% efficiency, 3 W/cm$^2$ is dissipated as energy while 7 W/cm$^2$ is retained in the form of heat. At a few hundred degrees the p-n junction doping in the cell 16 is lost and the bandgap energy drops; therefore the temperature must be kept as low as possible. Additionally, at 200° C., the focusing qualities of PDMS will begin to deteriorate. It is very important that a system of heat sinks 18 can dissipate the excess heat if the temperature were to rise by 50–80° C. One embodiment for heat sinks 18 is an array of blocks of aluminum (not shown), which array can either be solid or stamped out. Another cheaper alternative for heat sinks 18 is to coat a polymer sheet, such as a polyimide Kapton® sheet with a metal coating, either aluminum or copper. Yet another option for heat sinks 18 is to incorporate a fluid channel with water (not shown) to dissipate heat as well.

Materials and Methods

The lenses 12, 14 are fabricated out of GE Silicones RTV615, which is composed of two parts: A (a silicone rubber compound) and B (a silicone curing agent). Both parts are composed of polydimethylsiloxane, benzene, and toluene. Polydimethylsiloxane ($C_{10}H_{24}O_2Si_3$) is a room temperature vulcanized silicone rubber compound, which cures in 24 hours at room temperature or in one hour in an 80 degree oven. It is well known for its high strength and durability to shock, moisture, and other environmental hazards. It is ideal for optical use since it is clear and has a refractive index of 1.406, very close to that of glass. A big advantage of PDMS over glass is that it is soft and easy to manipulate. It is also relatively cheap ($24.50 for a pound container in 2001), and retains its properties up to 200° C., which is important considering the amount of heat from the sun that will be flowing through the lenses.

The two types of lenses which were produced were solid immersion lenses 14 and Fresnel lenses 12. Solid immersion lenses (SIL) 12 are spherical lenses which are slightly greater than hemispherical. Traditionally, the height of the lens h=(1+1/n)r, where r is the radius of the sphere that forms the majority of the lens, and n is the refractive index of the material. An SIL 14 is a lens that is very difficult if not impossible to make accurately in glass. Light from any direction will focus at the center 20 of the base of the solid immersion lens 14, which is where the photovoltaic substrate 16 is placed as shown in FIG. 1. In the illustrated embodiment the substrate is a conventional thin film cell, whose detailed structure is not materially relevant to the invention and hence will not be further described. It must be understood that any photovoltaic cell now known or later devised can be substituted as an equivalent. It has been shown that the substrate 16 needs to be within $\lambda/10$ of the base of the lens 14 to get a significant numerical aperture, where $\lambda$ is the wavelength of the incoming light.

Figure 2A:
FIG. 2 is a simplified side view comparing a conventional lens profile to that of a Fresnel lens.
Figure 2B:
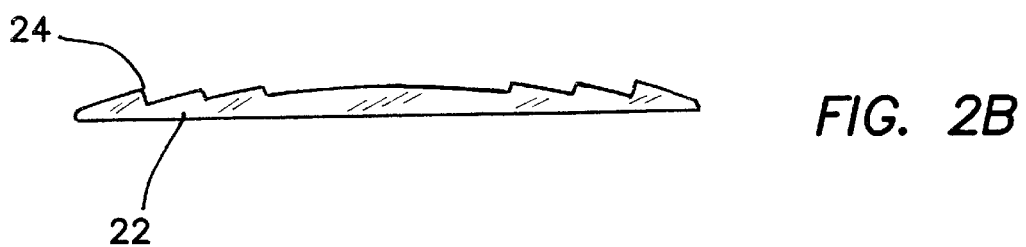

A Fresnel lens 12 performs the same function as a conventional lens, but has the advantage of being much thinner and therefore weighing much less. The part of the traditional lens that does not add to the focusing power of the lens is removed, leaving only the top layer of the lens, which collapse to form a Fresnel lens 12 shown in FIG. 2. The Fresnel lens 12 is comprised of many small concentric rings 22 which define jagged edges 24, each ring 22 focusing the light rays ultimately toward a central focal point 20 as shown in FIG. 1.

Microlenses 10 were fabricated in PDMS using soft lithography techniques. The material is first prepared by mixing the appropriate ratio of RTV615A to RTV615B by mass. For example, a 10:1 ratio means 10 grams of part A to every 1 gram of part B. After combining the two components in a sealed plastic jar, the jar was placed in the Keyence HM-501 Hybrid Mixer for one minute for mixing, followed by two minutes for defoaming.

Figure 3:
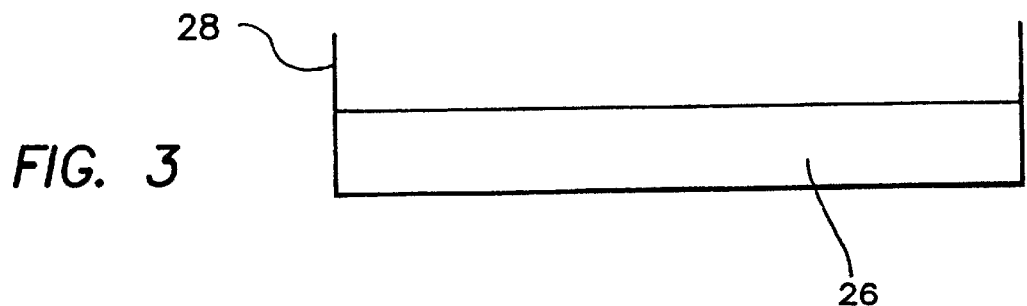
FIG. 3 is a simplified cross-sectional view of the first step in preparing a mold to make a solid immersion lens according to the invention.

For fabrication of the solid immersion lens 14, a small amount of material 26 is first poured into a Petri dish 28 of known area as shown in FIG. 3. The height of this layer of material 26 does not matter, since it is only to prevent the lens from being deformed by touching the base of Petri dish 28. However, it should not be made more than one third the height of the Petri dish 28 or else there is not enough room for the other layers described below. Petri dish 28 should then be placed in the vacuum pump to be degassed for an hour and then be placed in the oven for an hour.

Figure 4:
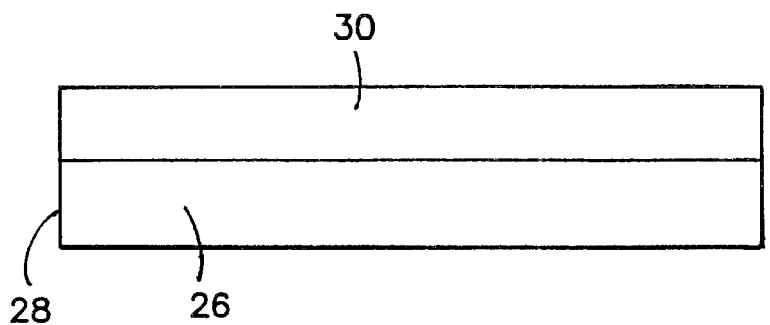
FIG. 4 is a simplified cross-sectional view of the second step in preparing a mold to make a solid immersion lens according to the invention.

The calculations for the next procedure of the method are as follows. Consider a sphere of radius 0.158 cm, six of which will be tiled in a rectangular Petri dish 28 of area 36.25 cm². The height of the lens h=R+R/n−a, where a is typically 0.05 cm for medium sized lenses, and insignificant for lenses with millimeter radii. Using n=1.42, we find that h=0.22 cm. The volume of the box we will fill is then V=hA=7.95 cm³. The absolute volume of a sphere with the given radius and height is 0.0129 cm³. The volume of RTV we must pour is then the volume of the box we will fill minus the absolute volume of six spheres, in the case where we are fabricated six lenses at a time. This calculation will yield a volume of 7.87 cm³. Since RTV has a density of 1.02, we will pour 8.03 grams of it into Petri dish 28 for our next layer 30 as shown in FIG. 4.

Figure 5:
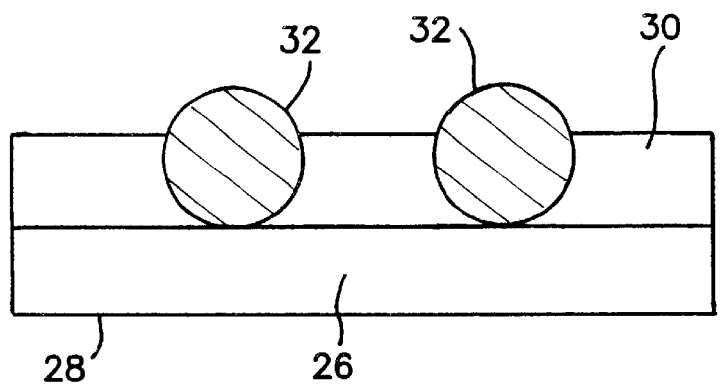
FIG. 5 is a simplified cross-sectional view of the third step in preparing a mold to make a solid immersion lens according to the invention.

We then place our six ruby ball bearings 32 spaced evenly into the dish 28 into layer 30 before it sets. In the depiction of FIG. 5 only two of the six balls are shown for the sake of simplicity. Dish 28 is then placed in a degassing machine for an hour and oven for another hour (these times are standard so all future mention of degassing and curing will imply these times).

Figure 6:
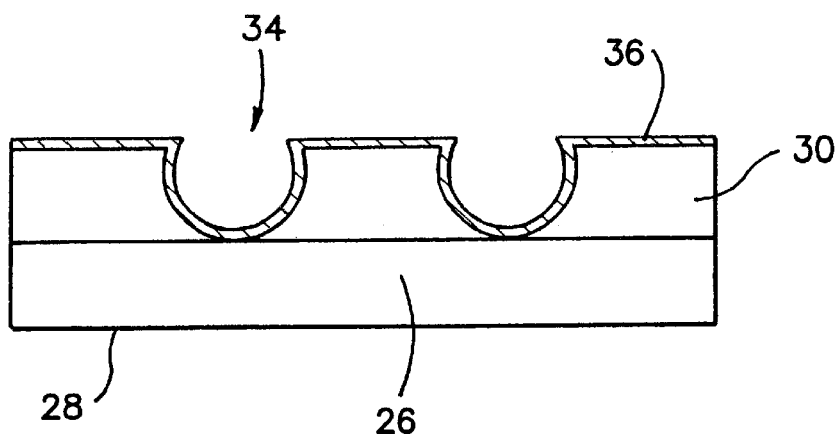
FIG. 6 is a simplified cross-sectional view of the fourth step in preparing a mold to make a solid immersion lens according to the invention.

After the material has cured, we remove ball bearings 32 with a pair of tweezers, poking around each ball 32 until it jars loose from its mold 34 formed in layer 30 as shown in FIG. 6. Mold 34 is then placed into SPI Supplies Plasma Prep II, which is a high pressure plasma etching system manufactured by SPI, a procedure which takes about 20 minutes total. Most of this time is for roughing the chamber and for allowing the pressure inside to decrease to less than 300 mTorr. The frequency of 13.56 Mhz is tuned inside to a bright purple/blue, and mold 34 in dish 28 left in for about 3 minutes. This procedure forms a thin barrier 36 along the top edge of the mold 34 so that when more PDMS is poured into the mold 34 to make lens 14, it won't stick to the mold 34.

Figure 7:
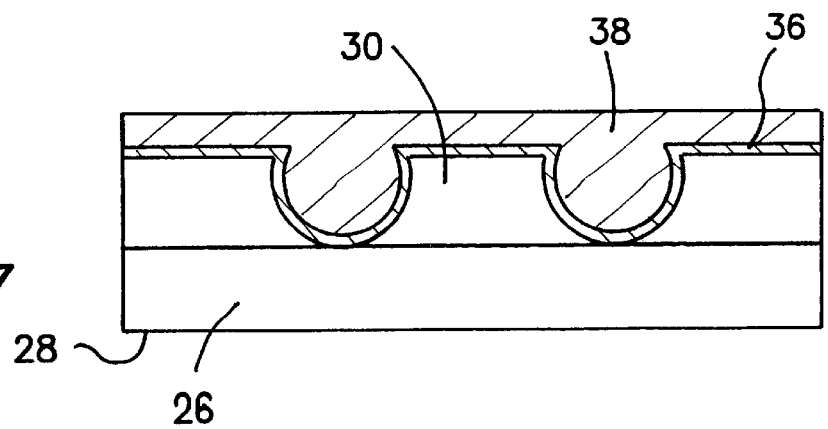
FIG. 7 is a simplified cross-sectional view of the fifth step in preparing a mold to make a solid immersion lens according to the invention.

The next calculation is the mass of PDMS needed to fabricate lens 14. The mass must be sufficient to form layer 38 depicted in FIG. 7 on the right. The volume of layer 38 will equal the volume of six times the absolute volume of the sphere in case where six lenses 14 are made together with the specified height plus the volume of thin layer 42 (which is equal to the value of "a" times the area of Petri dish 28). This calculation will yield a volume of 1.89 cm³, or a mass of 1.92 grams. This amount is poured into dish 28, allowing it to form a flat surface 40. After degassing and placing in the oven for the appropriate times, lenses 14 are peeled from molds 34 using a pair of tweezers. Lenses 14 might come out with some difficulty at first, but will come out easier when mold 34 is bent slightly into a concave shape.

Solid immersion lenses 14 can be made on the order of millimeters to centimeters in radius. The only difference when trying to make smaller lenses is that the thickness of layer 42 can not be controlled very accurately. At this point, it is easier to fill petri dish 28 with an excess of PDMS and then place dish 28 in a spin coater so that only a very thin film of PDMS remains on top of lens 14. It is valuable to note that mold 34 can be reused as often as needed so long as lenses 14 are taken out properly and carefully.

Figure 8:
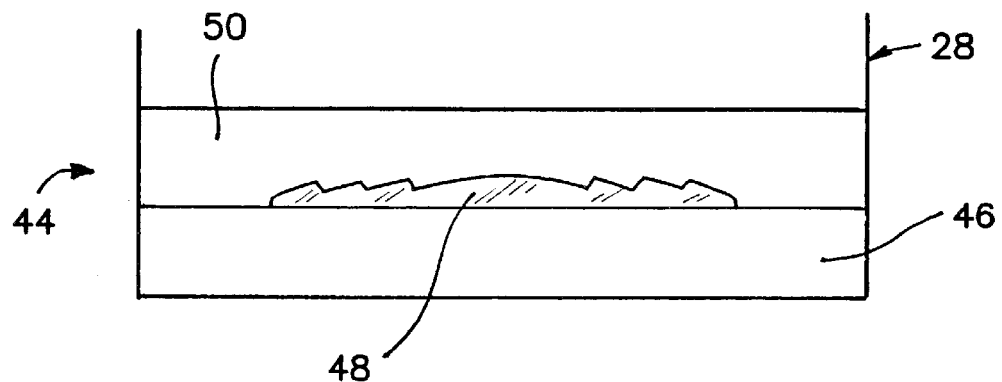
FIG. 8 is a simplified cross-sectional view of the beginning step in preparing a mold to make a Fresnel lens according to the invention.
Figure 9A:
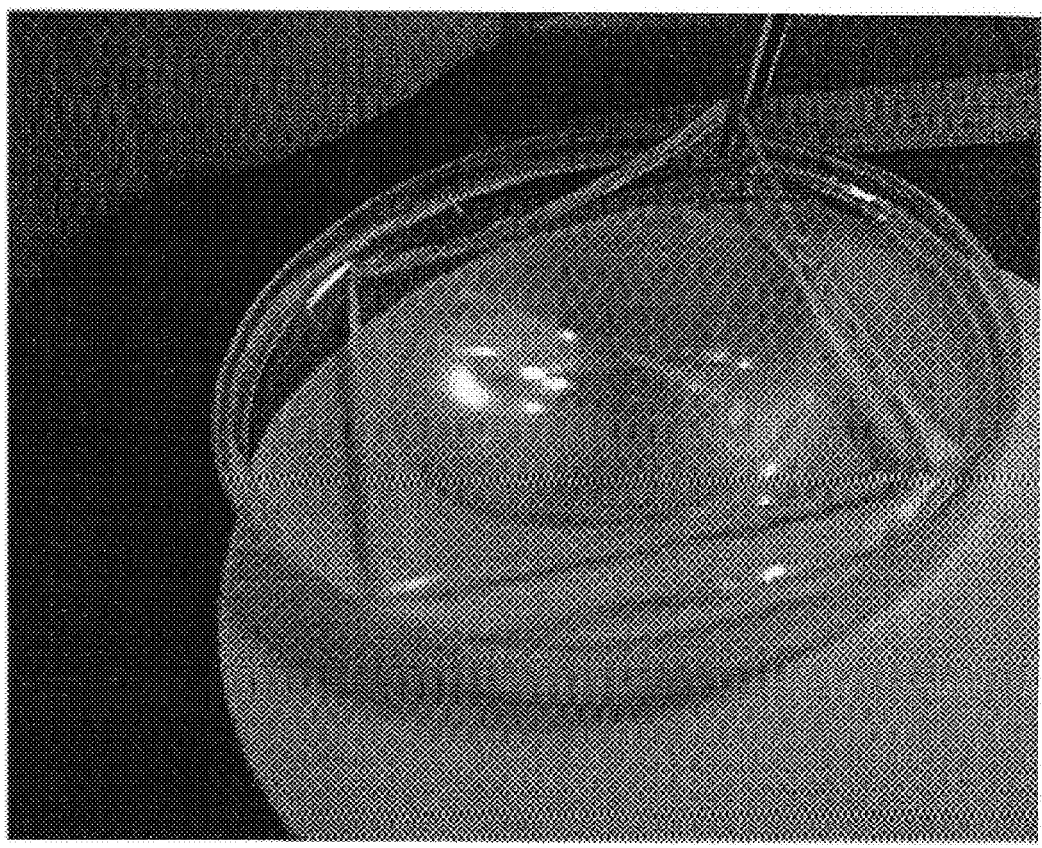
FIGS. 9a and 9b are perspective views showing the removal of the Fresnel form from the mold of FIG. 8.
Figure 9B:
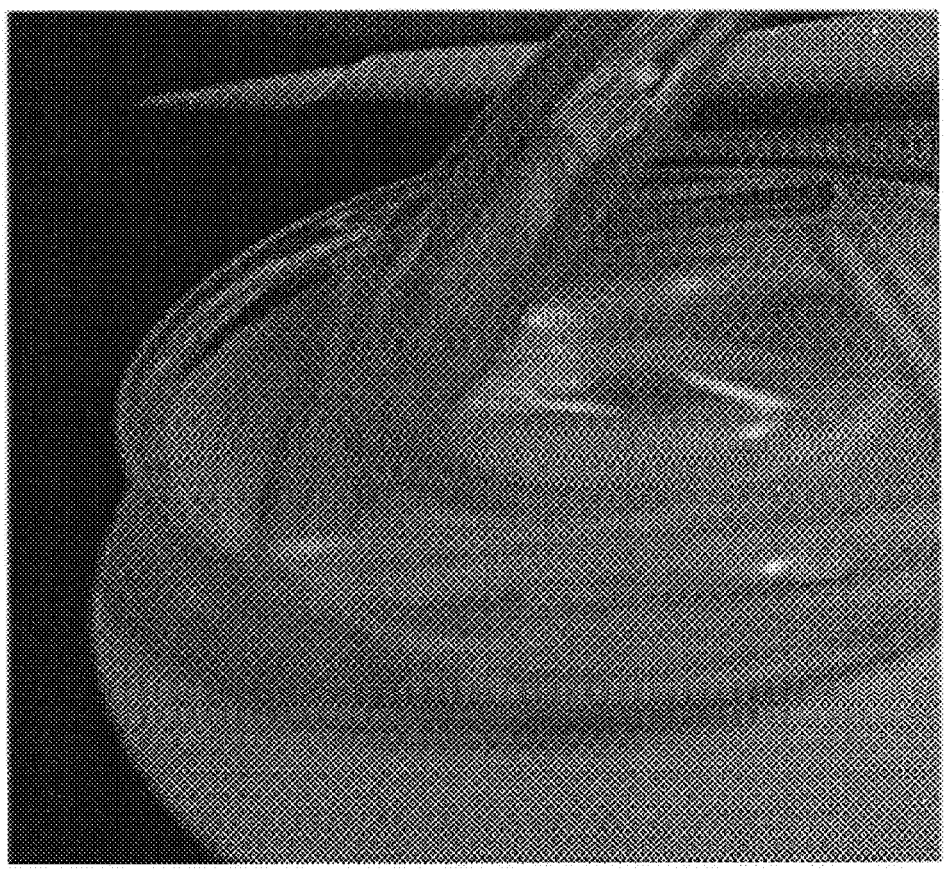

Fresnel lenses 12 are much easier to fabricate than solid immersion lenses 14, since they can be made out of an existing Fresnel glass lens. A mold 44 of Fresnel lens 12 is made by first pouring a layer 46 of PDMS into a petri dish 28 that is larger than the size of the Fresnel lens 12 as shown in FIG. 8. The thickness of layer 46, or any other layer in the fabrication of PDMS Fresnel lenses 12 does not matter. The first layer is then degassed and cured. A Fresnel glass lens master 48 is laid onto the PDMS layer 46. Master 48 applies a gentle pressure to layer 46 until all of the lower surface of Fresnel glass lens 48 intrudes into PDMS layer 46. The Fresnel lens 48 is covered completely with an excess layer 50 of PDMS to weigh it down. After degassing and curing, lens 48 is removed from the mold 44 by peeling the layers 50 and 46 apart as shown in FIG. 9. The resuling two part, cured mold 44 can now be used to replicate PDMS copies.

Results

Figure 10A:
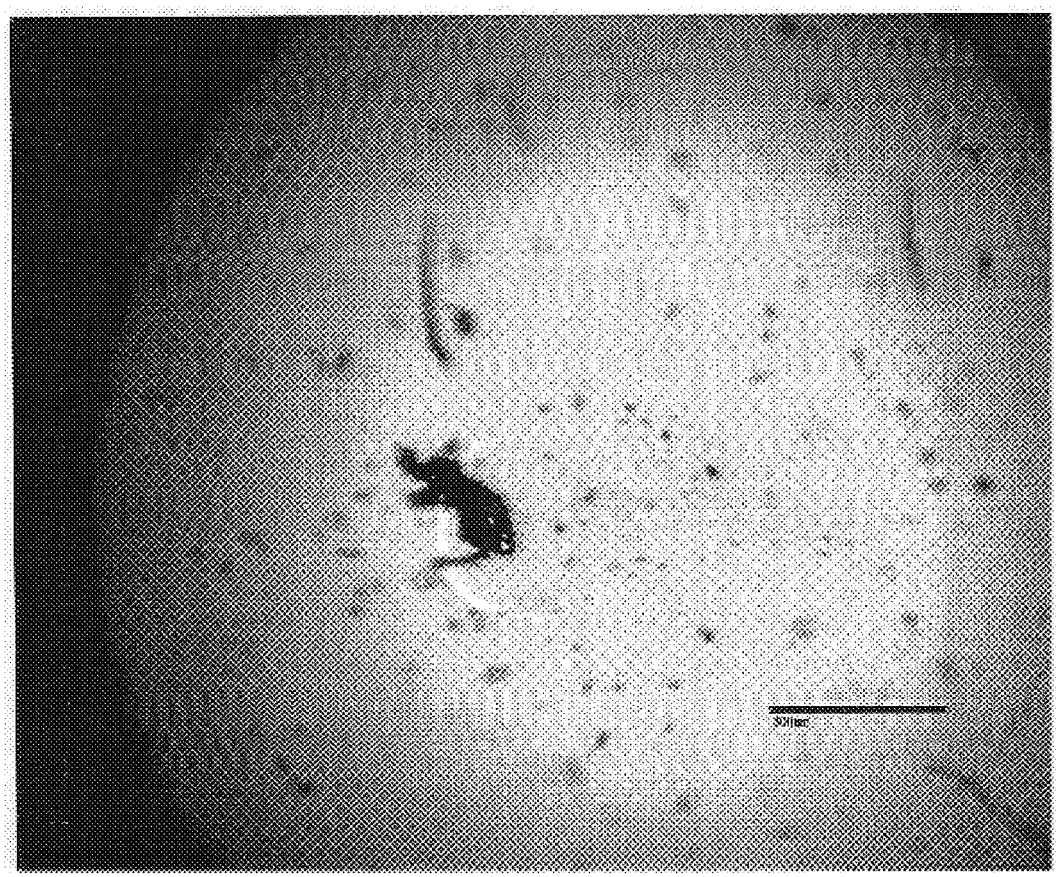
FIGS. 10a and 10b are microphotographs which show a lens before and after cleaning in which hair line and bubble defects are illustrated.
Figure 10B:
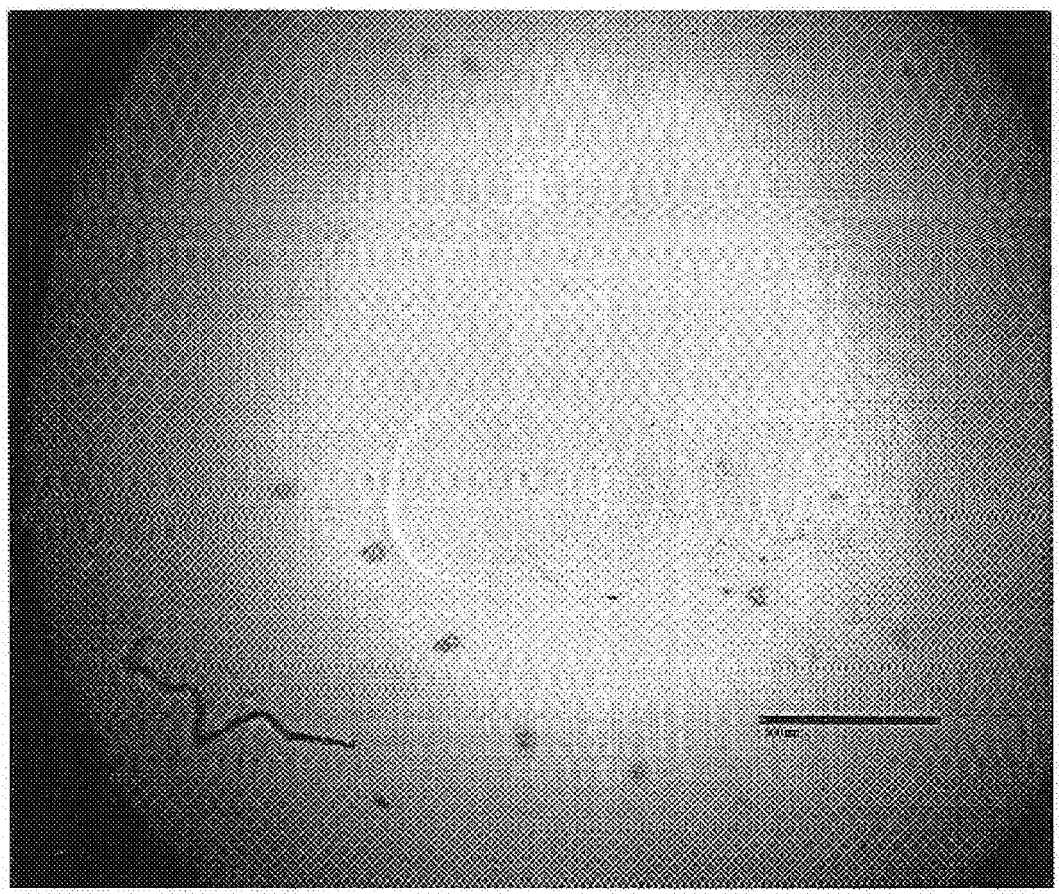
Figure 10C:
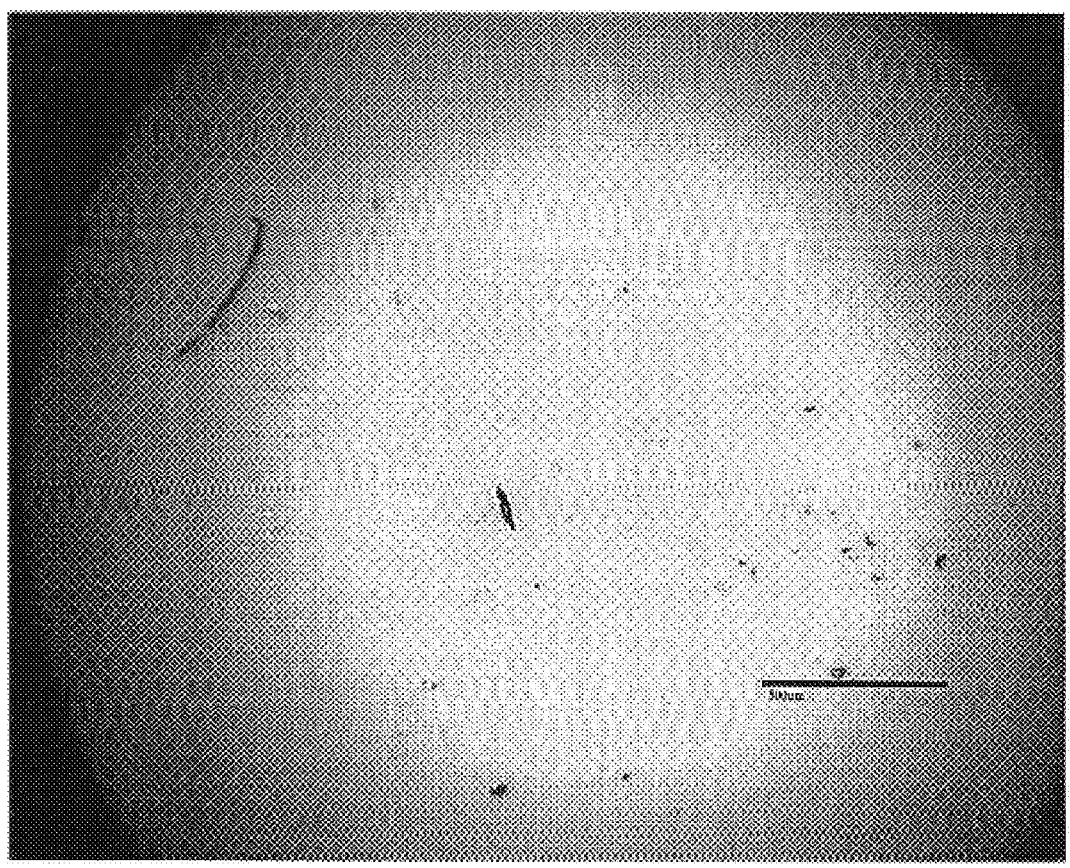
FIG. 10c is a microphotograph which shows a nearly defect free lens.

The fabricated lenses 12, 14 were all examined and photographed under a microscope to determine the types and level of acceptable aberrations that could potentially affect the performance of the lenses 12, 14. FIG. 10a shows a lens 10 before cleaning and FIG. 10b shows the same lens 10 after cleaning. FIGS. 10a and 10b depict a common trend of lenses: namely dark, black spots and hairline cracks on the surface that can be removed if treated appropriately. However, there are internal aberrations in the form of bubbles as shown in FIG. 10b that can not be removed once the material is cured. FIG. 10c shows a lens 10 with no internal aberrations.

In order to determine the transmittances of the PDMS material, nine block samples of PDMS were made. Samples were made in a circular Petri dish of 35 mm in diameter. Three different ratios of the components RTV615A and RTV615B were used (9:1, 10:1, and 11:1). In addition, samples were also produced in three different widths (5.0 mm, 2.5 mm, 1.25 mm).

Figure 11:
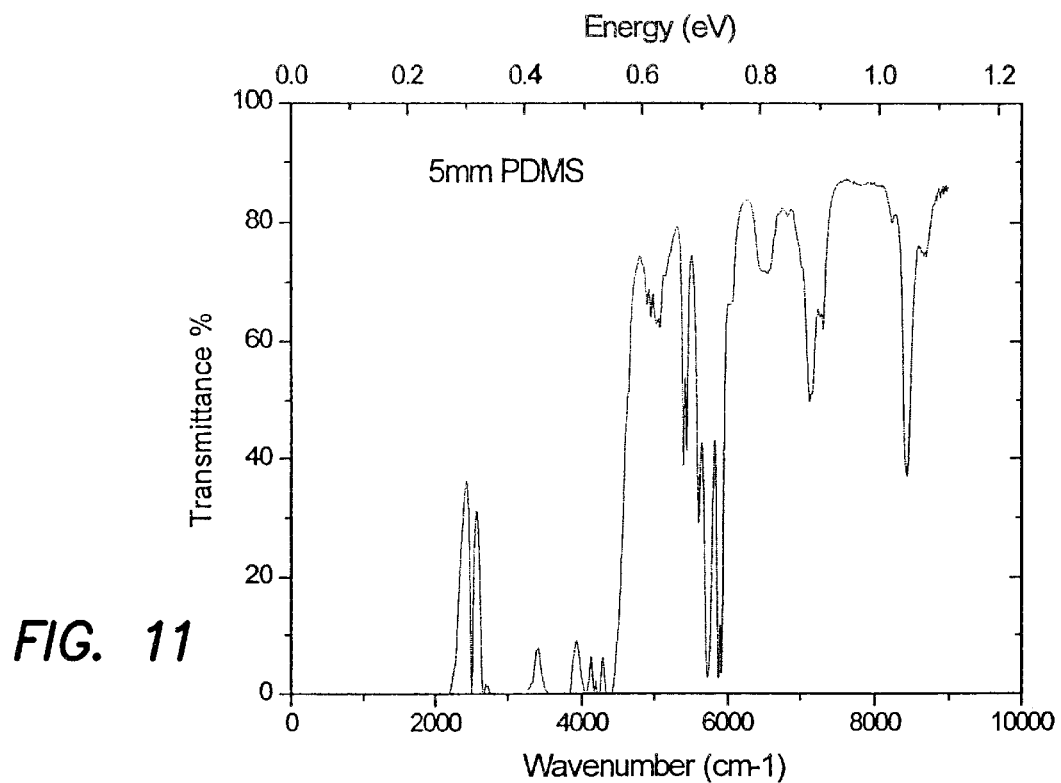
FIG. 11 is a graph of transmittance verses wavenumber for a lens made according to the invention.

Using the Fourier transform infrared (FTIR) spectrometer, the transmittances of the block samples of PDMS of three ratios were measured. The transmittance through the lens was measured against a background of air. The results are shown in the graph of FIG. 11. There were no noticeable differences among the three samples, thus the graph of transmittance versus wavenumber for the 11:1 sample in FIG. 11 is illustrative of all the samples.

There are common features, such as strong absorption below 4500 wavenumbers. A summary of the major absorption features is presented below in Table 1.

TABLE I

| absorption feature | absorption bands (in wavenumbers) |
|---|---|
| Si—O—Si | 440–460 cm⁻¹, 790–810 cm⁻¹, 1030–1080 cm⁻¹ |
| Si—O bond | 950–1250 cm⁻¹ |
| CH₃ bending | 1370–1460 cm⁻¹ |
| Si—H vibrations | 2000–2300 cm⁻¹ |
| toluene and byproducts | 2150 cm⁻¹, 3000 cm⁻¹, and 3300 cm⁻¹ |

Other notable absorption bands occur at 5500–6000 wavenumbers, 7200–7400 wavenumbers, and 8500–8600 wavenumbers. It is also important to note that a background scan indicates noise at higher wavenumbers.

Figure 12:
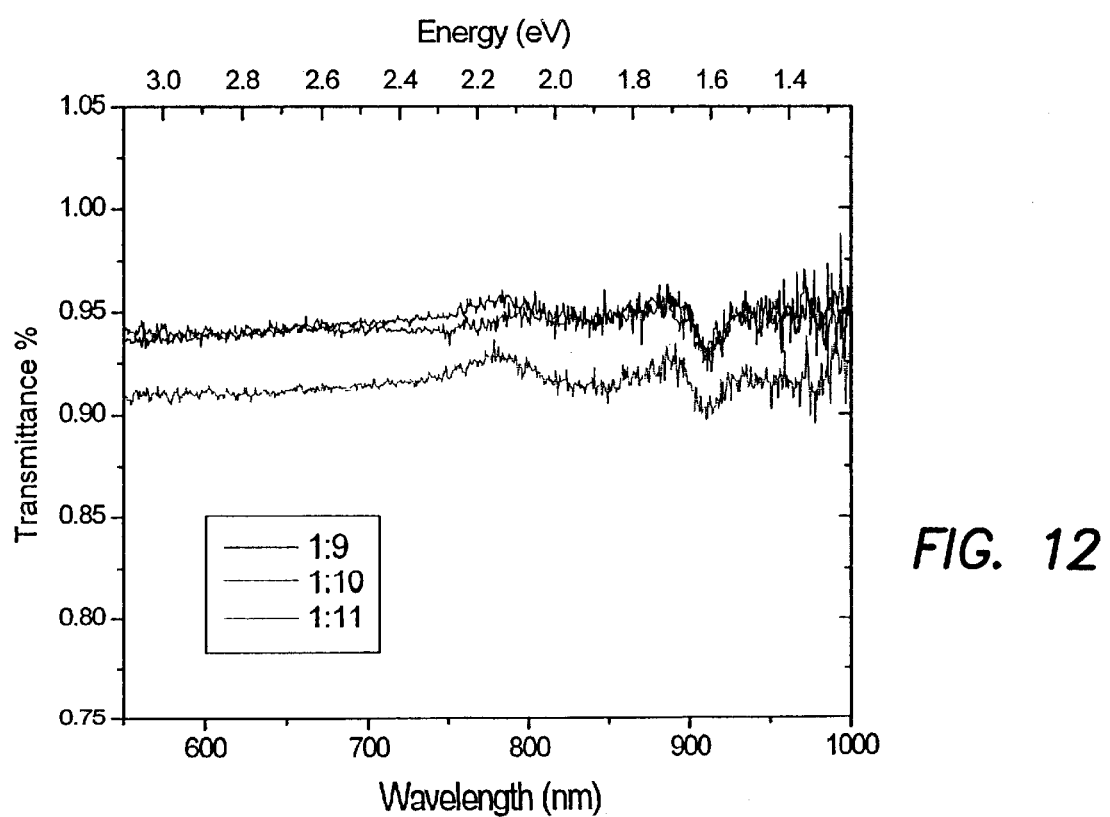
FIG. 12 is a graph of transmittance verses wavenumber for three blocks of PDMS which was 1.25 mm thick and had part A/part B ratios of 1:9, 1:10 and 1:11 by weight.
Figure 13:
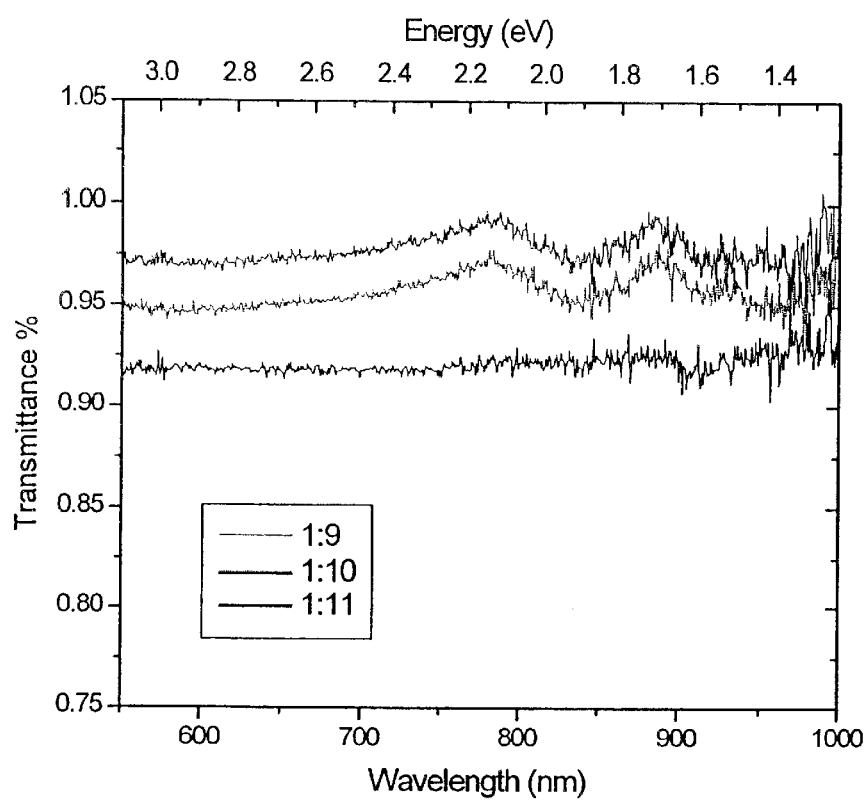
FIG. 13 is a graph of transmittance verses wavenumber for three blocks of PDMS which was 2.5 mm thick and had part A/part B ratios of 1:9, 1:10 and 1:11 by weight.
Figure 14:
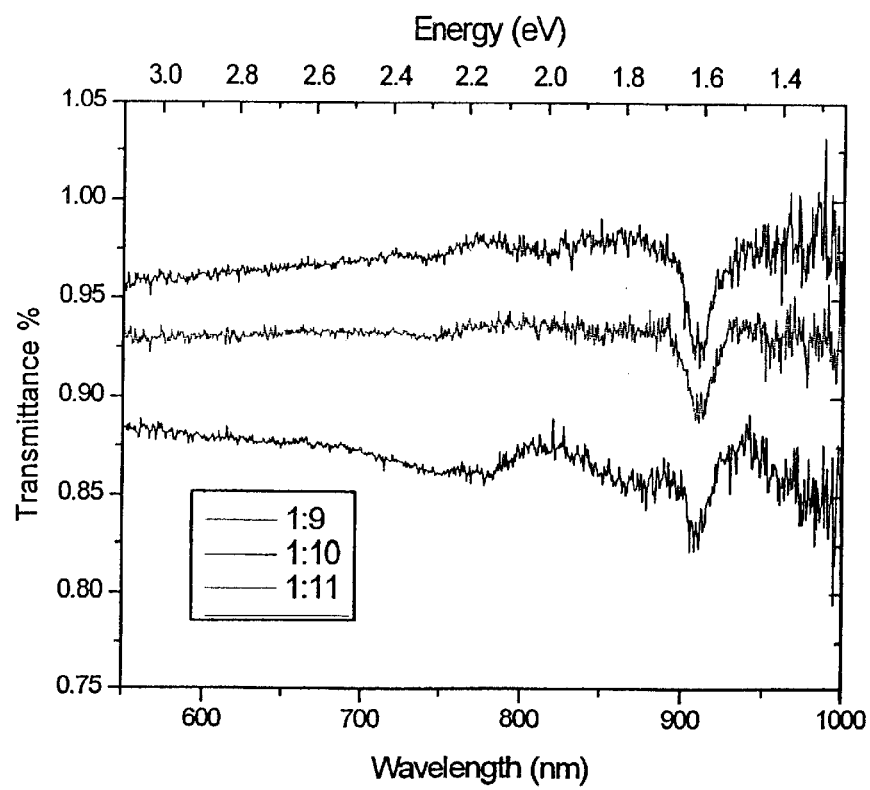
FIG. 14 is a graph of transmittance verses wavenumber for three blocks of PDMS which was 5.0 mm thick and had part A/part B ratios of 1:9, 1:10 and 1:11 by weight.

Since most of the light that will be converted to energy lies in the visual range, transmittance spectrums in the 550 nm to 1000 nm range were taken using an Optical Multi-channel Analyzer (OMA). All measurements were taken with the grating set at 786 nm and a 50 millisecond exposure time. The light source, a lamp, was set up $$21\frac{3}{8}$$

inches from the OMA. The sample holder, which included a grating to only let a small circle of light through, was set up inches from the analyzer. A lens to focus the light was set up $11\frac{1}{4}$ $8\frac{1}{4}$ inches from the analyzer. A background was first taken of just the light source to get a known intensity with which to compare the intensity of light through the samples. Due to the light source, wavelengths less than 550 nm were unstable. Each sample was held in place vertically at the same height off the table. All nine samples were tested, in three varying compositions and each in the three different widths. The results shown in FIGS. 12, 13 and 14 indicate varying transmittances from 85% to nearly 100%. FIG. 12 is a graph of the three samples of width 1.25 mm, FIG. 13 is a graph of the three samples of width 2.5 mm, and FIG. 14 is a graph of the samples of width 5.0 mm.

In general, the 1:9 samples had higher transmittances than the other two samples. However, the transmittance of a sample is not a direct function of the composition of the sample, as one might expect. In two out of three tests, the 1:11 samples had higher transmittances than the 1:10 samples.

Within the 1.25 mm width group, the three samples have transmittances that are close together, and all are approximately between 90% and 95%. Within the 2.5 mm width group, the three samples have transmittances that are more spread out, with a range of 91% to 98%. Within the 5.0 mm width group, the transmittances of the samples are spread out the most, with a range of 80% to nearly 100%. This trend is expected since the thicker the lens 10, the more absorption will occur, which will correspond to a lower transmittance. There is also an absorption band near 900–1000 nm in most of the samples that I believe is due to the presence of water (either moisture in the air or on the lenses).

Figure 15:
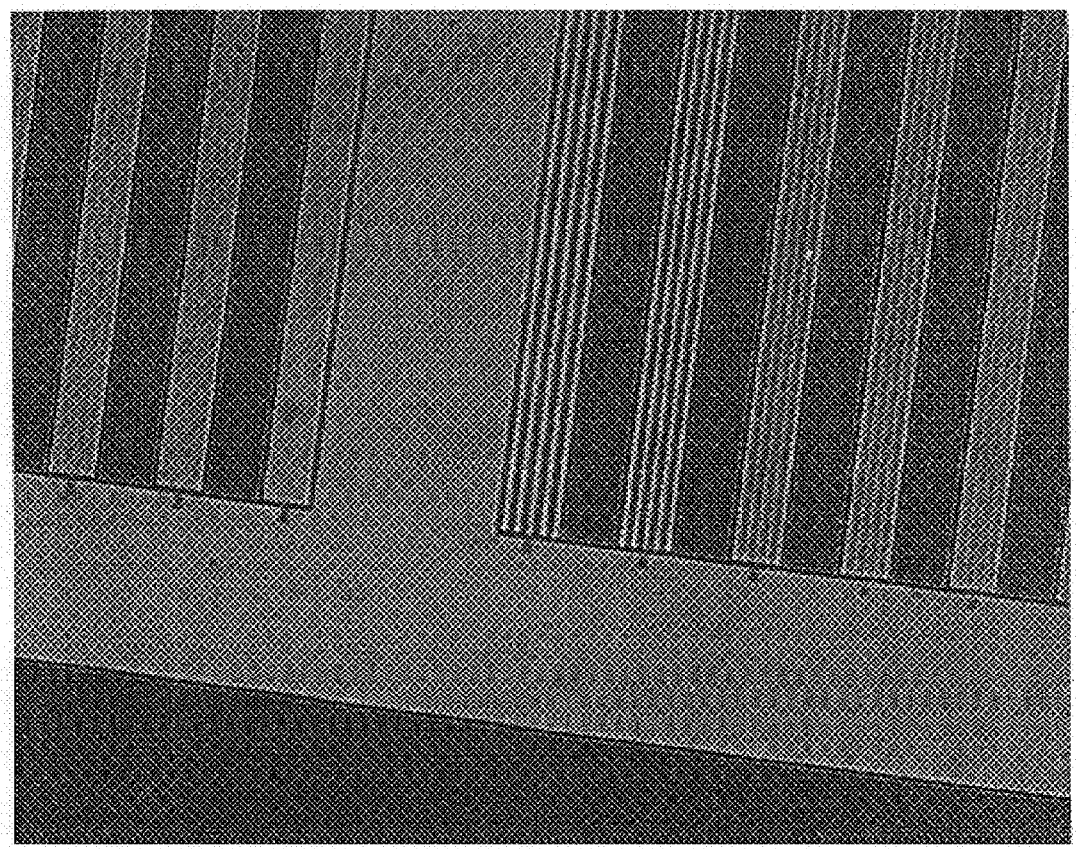
FIG. 15 is a photograph of a calibration pattern.
Figure 16:
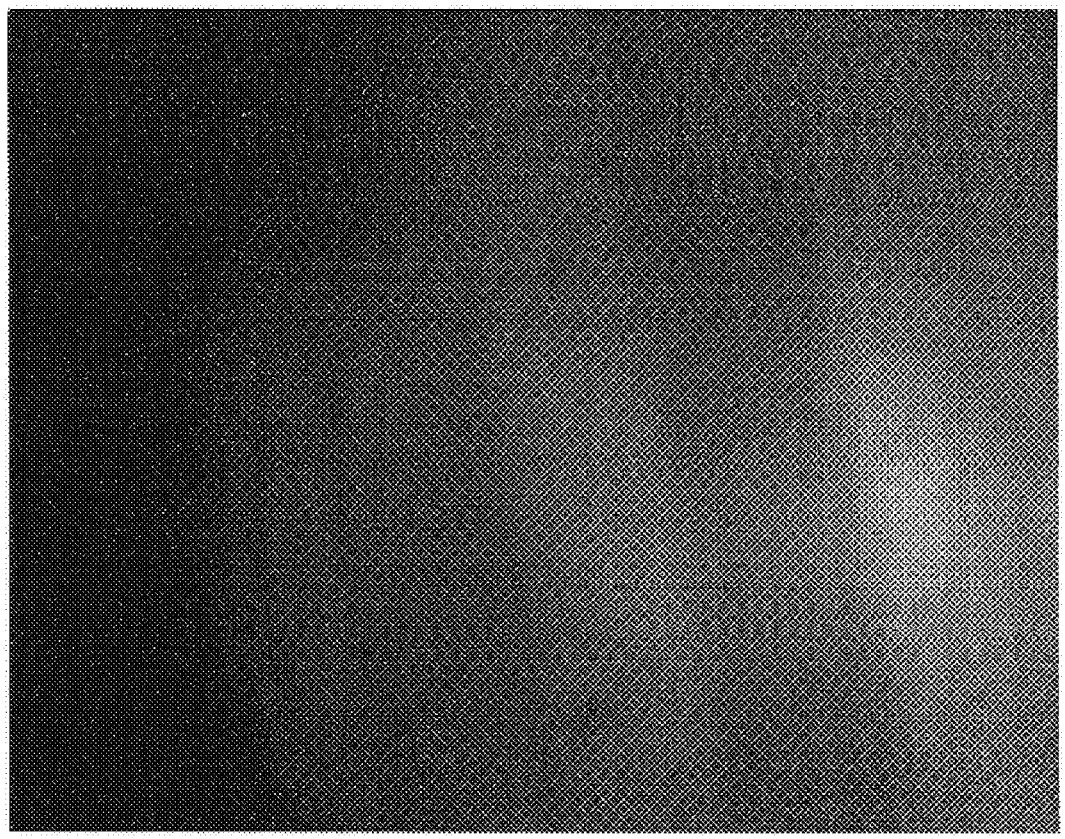
FIG. 16 is a photograph of the calibration pattern of FIG. 15 as magnified by a solid immersion lens of 0.317 mm in radius.

Lastly, the focal lengths and magnifications of the lenses 10 were characterized. Focal lengths were examined using a setup that held lens 10 in place while subjecting it to light. Lens 10 was then moved until the spot size was the smallest and most focused. The magnifications were estimated using an optical microscope connected to a camera that output to a TV. A calibration sample was first placed under the microscope as shown in FIG. 15 and the widths of the light and dark bands were measured on the TV. They were than compared to the widths of the bands when a lens was placed on top of the calibration sample as shown in FIG. 16 to determine the magnification. In the case of the double solid immersion lens 14, magnification measurements were taken with a solid immersion lens of radius 0.317 cm underneath it.

| type | Solid Immersion Lenses | | Double SIL | Fresnel Lens | |
|---|---|---|---|---|---|
| radius | 0.158 cm | 0.317 cm | 0.873 cm | 0.20 cm | 2.50 cm |
| focal length | 0.3–0.4 cm | 1.3–1.4 cm | 3.0 cm | 0.9 cm | 4.2 cm |
| magnification | 2 | 2 | 4 | 4 | 4 |

Varying the ratio of the components of RTV has a noticeable affect on transmittance in the visual range. The 9:1 samples have consistently higher transmittances than either of the other ratios, followed by the 11:1 and the 10:1 in that order. A difference in lens transmittance as large as those in the results (up to 10%) is crucial when considering the amount of light will directly affect the efficiency of a solar cell 18. The results of such high efficiencies, mostly near 100%, are promising.

Varying the ratio of the components of RTV has no noticeable affect on transmittance in the infrared range. Strong absorption at less than 4500 wavenumbers can be explained by bending or vibrations in the bonds of polydimethylsiloxane and its byproducts. However, since Germanium has a bandgap of 0.67 eV, which corresponds to 4500 wavenumbers, transmittance above 4500 wavenumbers is of more concern. Transmittance in the higher wavenumber range is encouraging, with near consistent 80% transmittance.

Magnification of solid immersion lenses and double solid immersion lenses are as expected. The solid immersion lenses 14 magnify images by a factor of about 2, and the combination of a double solid immersion lens and a solid immersion lens has a magnification of 4 (which is expected because each solid immersion lens is expected to contribute a factor of 2 to the final magnification). The magnifications of the Fresnel lenses 12 are smaller than expected, but this may be due to difficulties in focusing the images under the lenses 12 or that the existing lenses 12 did not have a very high magnification.

Additionally, variability in transmittance increases when the width of the sample is increased. This supports expected results. With greater widths, the material will absorb more of the incoming light, and thus transmit less light.

Dust and lint on the surface can be removed using a nitrogen gun or in water in an ultrasonic cleaner. The RTV material is known to absorb acidic, basic, and oxidizing materials, changing the clarity of the material and forming byproducts, so it's important to avoid contact with them and use water when possible. Bubbles are a property of the RTV material, but can be minimized by taking a longer time degassing the RTV material before curing it.

What results is a highly efficient photovoltaic cell based on heterostructure and fabricated by wafer bonding that integrates a thin film cell, micromirrors/lasers, and a heat sink to provide a low-cost photovoltaic solar cell technology.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method of fabricating a lens array for inclusion in a concentrator photovoltaic array comprising:
    forming a plurality of Fresnel lenses from optical grade silicone rubber;
    forming a plurality of solid immersion lenses from optical grade silicone rubber;
    combining the plurality of Fresnel lenses and plurality of solid immersion lenses to form a compound optical system for focusing light at a corresponding plurality of locations;
    disposing the compound optical system onto an array of photovoltaic cells such that light incident on the compound optical system is concentrated into each of the photovoltaic cells of the array.

2. The method of claim 1 where forming the plurality of solid immersion lenses comprises for each solid immersion lens:
    forming a cured bottom layer in a mold container;
    disposing a predetermined amount of molding material to form a second uncured layer on the bottom layer according to the desired height, h, of the solid immersion lens to be formed;
    embedding a spherical form into the second layer so that the spherical form rests on the bottom layer;
    curing the second layer with the spherical form in place;
    removing the spherical form from the cured second layer;
    disposing a predetermined amount of optical grade silicone rubber into the cured second layer according to the desired height of the solid immersion lens to be formed and according to the thickness of a base layer to be associated with the solid immersion lens;
    curing the optical grade silicone rubber in the second layer to form a cured solid immersion lens and base layer; and
    removing the cured solid immersion lens and base layer from the second layer.

3. The method of claim 2 where disposing the predetermined amount of molding material to form the second uncured layer comprises disposing sufficient molding material in the mold container to form the second uncured layer with a depth substantially equal to the desired height, h, of the solid immersion lens, where $h=R+R/n-a$, where "R" is the radius of a spherical lens, "n" is the index of refraction of the cured optical grade silicone rubber, and "a" is the thickness of the base layer associated with the solid immersion lens.

4. The method of claim 2 where forming the cured bottom layer in the mold container, and where curing the second layer with the spherical form in place comprise degassing the bottom layer and then heating the degassed bottom layer.

5. The method of claim 4 where degassing the bottom layer and then heating the degassed bottom layer comprises degassing for at least one hour and heating the degassed bottom layer for at least one hour.

6. The method of claim 5 further comprising forming a mold release layer on the cured second layer prior to disposing the predetermined amount of optical grade silicone rubber therein.

7. The method of claim 6 where forming the mold release layer comprises forming the mold release layer by plasma deposition.

8. The method of claim 1 where forming the plurality of Fresnel lenses, each having an upper and lower surface, comprises for each Fresnel lens:
    forming a cured bottom layer in a mold container;
    pressing a Fresnel lens form into the bottom layer so that the lower surface of the Fresnel lens form is completely embedded into the bottom layer;
    completely covering the upper surface of the Fresnel lens form with molding material to form a second layer in which the Fresnel lens form is embedded;
    curing the second layer with the Fresnel lens form in place;
    removing the cured second layer;
    removing the Fresnel lens form from the bottom layer;
    disposing optical grade silicone rubber into a mold formed by the cured second layer and bottom layer;
    curing the optical grade silicone rubber in the mold to form a Fresnel lens; and
    removing the cured Fresnel lens from the mold.

9. The method of claim 8 where forming the cured bottom layer in the mold container, where curing the second layer with the Fresnel lens form in place, and where curing the optical grade silicone rubber in the mold to form the Fresnel lens comprise degassing the bottom layer, second layer and optical grade silicone rubber in the mold respectively and then heating the degassed bottom layer, second layer and optical grade silicone rubber in the mold respectively.

10. The method of claim 9 where degassing and then heating comprises degassing the bottom layer, second layer and optical grade silicone rubber in the mold respectively for at least one hour and heating the bottom layer, second layer and optical grade silicone rubber in the mold respectively for at least one hour.

11. The method of claim 1 further comprising cleaning the plurality of solid immersion lenses and the plurality of Fresnel lenses.

12. The method of claim 1 where forming the plurality of Fresnel lenses and the plurality of solid immersion lenses comprises using GE Silicones RTV615 as the optical grade silicone rubber.

13. The method of claim 1 where forming the plurality of Fresnel lenses and the plurality of solid immersion lenses comprises mixing a silicone rubber compound and a silicone curing agent, and then defoaming the mixed silicone rubber compound and a silicone curing agent.

14. The method of claim 13 where mixing a silicone rubber compound and a silicone curing agent comprises mixing not more than 9 parts silicone rubber compound by weight to 1 part silicone curing agent by weight.

15. A photovoltaic array comprising:
- a plurality of Fresnel lenses composed of molded optical grade silicone rubber;
- a plurality of a solid immersion lenses composed of molded optical grade silicone rubber, where the plurality of Fresnel lenses and plurality of solid immersion lenses are combined to form a compound optical system for focusing light at a corresponding plurality of locations; and
- an array of photovoltaic cells such that light incident on the compound optical system is concentrated into each of the photovoltaic cells of the array.

16. The photovoltaic array of claim 15 where one Fresnel lens is combined with a single solid immersion lens to focus light for photovoltaic cell of the photovoltaic array.

17. The photovoltaic array of claim 15 where one Fresnel lens is combined with a double solid immersion lens to focus light for photovoltaic cell of the photovoltaic array.

18. The photovoltaic array of claim 15 where the plurality of Fresnel lenses and the plurality of solid immersion lenses are molded in an array from GE Silicones RTV615.

19. The photovoltaic array of claim 15 where the optical grade silicone rubber is comprised of a silicone rubber compound and a silicone curing agent.

20. The photovoltaic array of claim 19 where the silicone rubber compound and silicone curing agent are mixed together in a ratio of not more than 9 parts silicone rubber compound by weight to 1 part silicone curing agent by weight.

\* \* \* \* \*